United States Patent [19]

Weisgerber

[11] Patent Number: 5,739,894
[45] Date of Patent: Apr. 14, 1998

[54] METHOD FOR EXHIBITING CINEMATIC IMAGES PHOTOGRAPHED AT TWO DIFFERENT FRAME RATES

[76] Inventor: Robert C. Weisgerber, 245 E. 93d St., Apt. 32A, New York, N.Y. 10128

[21] Appl. No.: 702,063

[22] Filed: Aug. 23, 1996

Related U.S. Application Data

[63] Continuation-in-part of Ser. No. 519,244, Aug. 25, 1995.

[51] Int. Cl.⁶ .................................................. G03B 21/32
[52] U.S. Cl. ...................................................... 352/46
[58] Field of Search ............................. 352/84, 46, 81, 352/97, 44, 239

[56] References Cited

U.S. PATENT DOCUMENTS

| | | | |
|---|---|---|---|
| 3,585,292 | 6/1971 | Crowder | 178/7.2 |
| 4,889,423 | 12/1989 | Trumbull | 352/46 |
| 5,096,286 | 3/1992 | Weisgerber | 352/40 |

*Primary Examiner*—Daniel P. Malley
*Attorney, Agent, or Firm*—David Peter Alan

[57] ABSTRACT

A method is disclosed whereby cinematic image components photographed at one frame rate are composited with other cinematic image components photographed at a higher frame rate, to produce images containing some components that deliver a more realistic impression to the audiences viewing such images than are delivered by the other image components. This method is applicable to any combination of frame rates, as long as one frame rate is greater than thirty frames per second, and the other is thirty frames per second or less. Scenes or sequences photographed at different frame rates and containing entire images can also be combined into a single motion picture by intercutting in accordance with this method. In addition, this method allows conversion of films photographed at nonstandard frame rates to be converted to a universal format for exhibition in conventional motion picture theaters, thus eliminating the restriction of films of this sort to special venues.

13 Claims, 2 Drawing Sheets

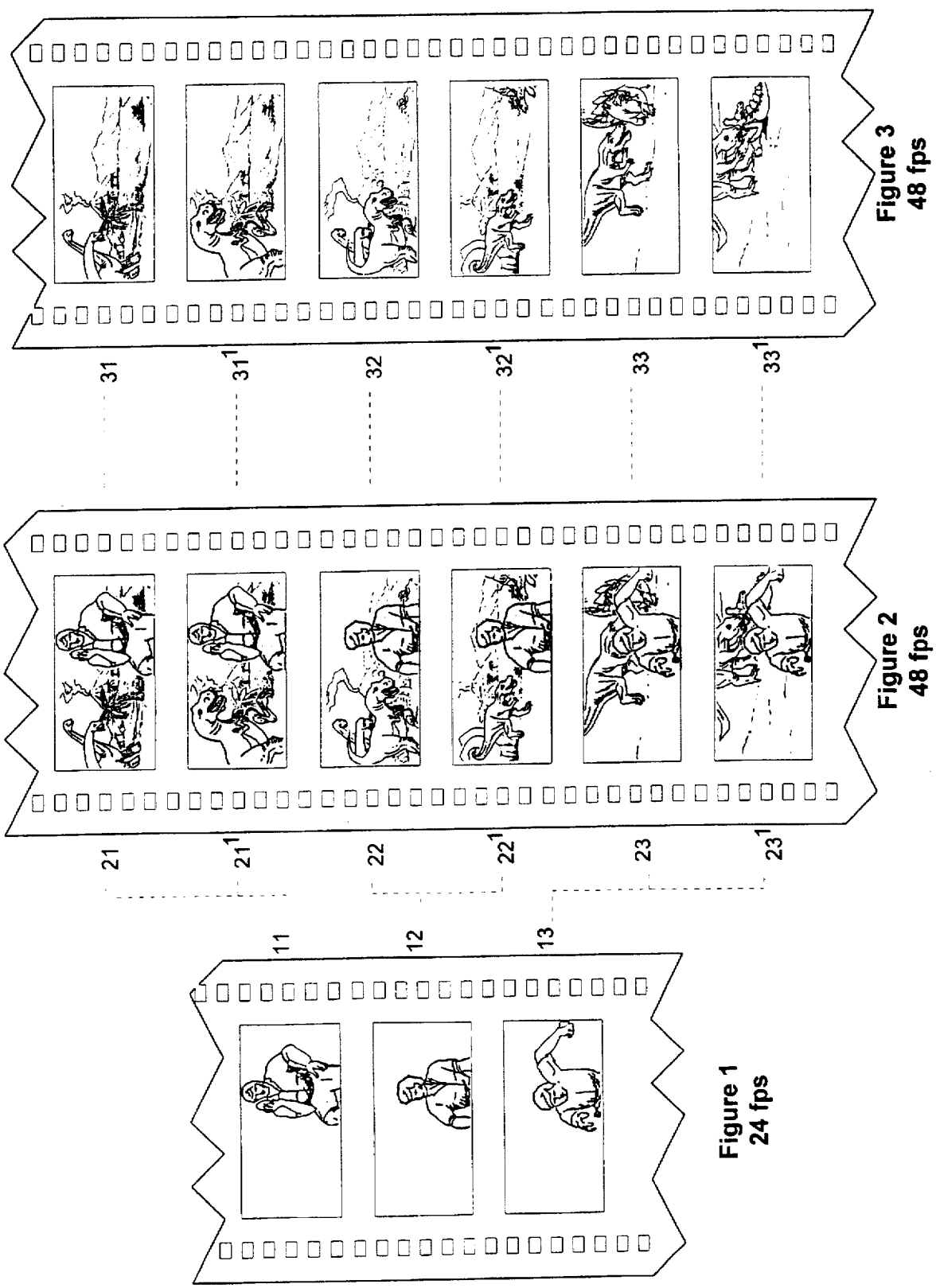

METHOD FOR EXHIBITING CINEMATIC IMAGES PHOTOGRAPHED AT TWO DIFFERENT FRAME RATES

This application is a continuation in part of and copending with application Ser. No. 08/519,244, filed Aug. 25, 1995 and on which a patent will soon be issued.

BACKGROUND OF THE INVENTION

This invention is derived from another recent invention by Weisgerber, METHOD FOR IMPARTING BOTH HIGH-IMPACT CINEMATIC IMAGES AND CONVENTIONAL CINEMATIC IMAGES ON THE SAME STRIP OF MOTION PICTURE FILM, application Ser. No. 08/519,244, filed Aug. 25, 1995 and soon to be the subject of an issued patent.

In his recent invention, Weisgerber teaches the compositing of cinematic image components photographed at 24 frames per second with other image components photographed at 48 frames per second, onto the same strip of motion picture film. The composite film is to be shown at 48 frames per second, and each image originally photographed at 24 frames per second is Printed onto two successive frames, composited with successive image components originally photographed at 48 frames per second. The result is a mix of image components that look highly realistic (high frame rate) along with other image components that retain the "cinematic look" associated with low frame rates (such as 24 frames per second). In other words, such artifacts as strobing and motion blur that give the viewer the "cinematic look" associated with low frame rates are present in certain components of the images seen by the viewer and absent in other components. The image components without these artifacts appear more realistic to the viewers than the image components with these artifacts.

The projector on which the films in question are shown must be capable of delivering a steady image during projection at 48 frames per second. A pin-registered projector such as the "Linear Loop" projector manufactured by Pioneer Technologies of Burbank, Calif., is acceptable for the operation described. Weisgerber's recent invention also permits intercutting of high impact scenes and scenes delivering conventional "cinematic" experience, when it is not desired to mix image components during a single scene or sequence. High impact scenes are photographed and shown at 48 frames per second, while low impact scenes are photographed at 24 frames per second with each frame printed twice for projection at 48 frames per second. As an added feature with the intercutting method, conventional light levels (10.6 footlamberts, for example) can be used for the low impact scenes and high brightness levels (such as 16.5 footlamberts) can be used for the high impact scenes. The film to be shown can be coded with a command to turn on a brighter light in the projector for the high impact scenes.

The previous invention claimed only the frame rates of 24 and 48 frames per second; the convenitonal frame rate (especially in the United States and Canada) and a rate twice as fast. In reality, however, this method will work at other frame rates. It is an objective of this invention to extend the method previously disclosed by Weisgerber to other combinations of frame rates, thereby broadening the usefulness of the invention. It is a further objective of the invention to allow conversion of motion picture films produced at different frame rates to standard frame rates for exhibition in conventional motion picture theaters. Such conversion would eliminate the need for nonstandard equipment and special venues when showing such films, resulting in the possibility of general distribution and release for films that could heretofore not be seen by general audiences.

Although the previous invention specified frame rates of 24 and 48 frames per second, the principle of the invention also works for other combinations of frame rates. The critical factor is the number of discrete image impressions seen by the camera and viewers each second. When silent films were photographed at sixteen frames per second and shown through a triple bladed shutter, viewers were shown forty-eight image impressions per second. Since the 1920s, sound films have been photographed at 24 frames per second and shown through a double bladed shutter, maintaining 48 image impressions per second. There have been experiments with even higher frame rates. Oklahoma and Around the World in Eighty Days were photographed in Todd-AO at thirty frames per second and shown through a double bladed shutter for sixty image impressions per second (in addition to general release versions photographed separately at 24 frames per second). More recently, SHOWSCAN productions have also presented sixty image impressons per second to the viewers by presenting sixty new images every second.

There is a certain "cinematic" look to motion pictures photographed at 24 fps, that Present only 48 image impressions per second. This look is caused by such artifacts as flicker, motion blur and strobing. These artifacts are the result of the short duration of the persistence of vision. Humans do not fully remember an image for as long as 1/48 of a second, but for slightly less than 1/60 of a second. These brief gaps in the persistance of vision create artifacts that form the "cinematic look" of 24 fps projection. Photography at 30, 48 or 60 images per second reduces these artifacts, while not eliminating them altogether. With a double bladed shutter, projection at 30 or 48 fps (or at 60 fps with a single bladed shutter) substantially eliminates flicker and delivers motion that appears more natural than motion associated with the "cinematic look" of films photographed and projected at 24 fps.

These artifacts that occur at lower frame rates are desirable for the purposes of this invention. Stated most simply, the objective of this invention is to present certain image components that possess the "cinematic look" associated with low frame rate photography, along with other image components that possess a more realistic look associated with higher frame rate photography and projection, within the context of a single motion picture. This can be done between scenes of a picture by intercutting scenes photographed at a lower frame rate (and presenting the "cinematic look") with scenes photographed at a higher frame rate and presenting a more realistic look. A method for presenting motion pictures with scenes photographed at both 24 and 30 frames per second was taught previously by Weisgerber in U.S. Pat. No. 5,096,286 (1992). While a frame rate higher than 30 fps would have reduced "cinematic" artifacts far below the level achieved at 30 fps, the previous invention depended on use of selective underexposure of certain transitional frames to artificially induce flicker during the transition, which lasted from 2 to 2 ½ seconds. Transition to a higher speed, such as 36 fps, would have taken too long to be practical although 36 fps would have reduced "cinematic look" artifacts below perceptible levels.

More recently, Weisgerber taught the use of 24 and 48 frame rates for use in "cinematic look" and high-impact scenes (App. Ser. No. 08/519,244, with patent soon to issue). The use of one frame rate that is double the other introduced the added application of photographing certain image components at the higher frame rate so they appear highly

3 realistic, while photographing other image components at the lower frame rate, so they retain the "cinematic look" associated with the lower frame rate. These image components are then composited onto a single strip of motion picture film to produce images that look "cinematic" in part and highly realistic in other part. These films are projected at the higher frame rate.

BRIEF DESCRIPTION OF THE INVENTION

This invention concerns presentation of motion pictures with audience impact being modulated by intercutting between scenes, or by compositing separate image componants onto a strip of film; with some components having a "cinematic" look and other components having a highly realistic look. This is done by using two different frame rates to photograph these scenes or image components and projecting the film in question at the higher of the frame rates.

For example, in his recent invention, Weisgerber taught these methods using 24 frames per second as the lower frame rate and 48 frames per second as the higher frame rate. In the preferred embodiment, image components photographed at 24 fps are composited with other image components photographed at 48 fps, onto a single strip of film that is shown through a projector at 48 fps. In the practice of the invention, the image components photographed at the lower frame rate retain the "cinematic" look, while the image components photographed at the higher frame rate appear more realistic to the viewer. Projection at the higher frame rate through a double bladed shutter ensured that the viewers received sufficiently many image impressions per second that the artifacts (such as strobing, motion blur and picketing) that deliver the "cinematic" look are absent from the image components photographed and projected at the higher frame rate.

The previous invention also disclosed the intercutting of scenes photographed at the lower frame rate with other scenes photographed at the higher frame rate. This method produces motion pictures that deliver a higher impact to the viewer in some scenes than in others. As an added feature, light brightness level can be switched between conventional levels (about 10.6 footlamberts) for the scenes photographed at the lower frame rate and high brightness level (16.5 footlamberts or more) for scenes photographed at the higher frame rate.

In the Present invention, the concept previously disclosed is expanded to include other combinations of frame rates. Per example, the frame rates of 25 and 50 fps could be used in either application mentioned above. This would make the method disclosed compatible with the European standard of 50Hz. AC Dower. While they may not have immediate application, other combinations of frame rates are also feasible for use with the method disclosed. The frame rate of 26 fps (used by Cinerama in the late 1950s and early 1960s) could be coupled with 52 fps. Frame rates of 30 and 60 fps could be used to introduce some of the artifacts associated with the "cinematic look" into films produced to be shown at 60 fps (e.g. SHOWSCAN) with a single bladed shutter, as now practiced.

It does not appear feasible to have the lower frame rate exceed 30 fps, since the "cinematic look" artificts disappear at higher speeds (assuming a double bladed shutter, since it is actually more than 60 image impressions per second that constitutes the threshold). Lower speeds could also be used, such as 18 and 36, or even 16 and 32 fps. The defining feature of the invention is that the lower frame rate deliver 60 or fewer image impressions per second, the higher frame rate must produce more than 60, and the two frame rates must be sufficiently different that the viewers of the film being shown must notice the difference between the "cinematic" look and the high impact look presented either simultaneously or in separate scenes or sequences that are intercut.

The method described can be used to easily produce prints for general release at standard frame rates, by using computer imaging techniques to exaggerate the effects of such artifacts as strobing and motion blur, if required. The result will be a convincing and "cinematic looking" presentation for the viewers of the film.

BRIEF DESCRIPTION OF THE DRAWINGS

The first three drawing figures represent motion picture film strips containing picture information. The portions of the film containing audio, time code and other nonpicture information are not depicted.

FIG. 1 shows a strip of film, photographed at a frame rate of thirty frames per second or less, depicting a blank background and a man in the foreground.

FIG. 2 shows a strip of film containing twice as many images as on the film in FIG. 1, for projection at a frame rate in excess of thirty frames per second, such images being animated dinosaurs.

FIG. 3 shows a strip of film Printed for projection at the frame rate at which the images depicted in FIG. 2 were Printed, showing a composite of the images contained on the film strips depicted in FIGS. 1 and 2, with each image from FIG. 1 composited with two successive images from FIG. 2, with the resulting composite images showing the man depicted in FIG. 1 appearing to interact with the dinosaurs depicted in FIG. 2.

DETAILED DESCRIPTION OF THE INVENTION

Figure 4:
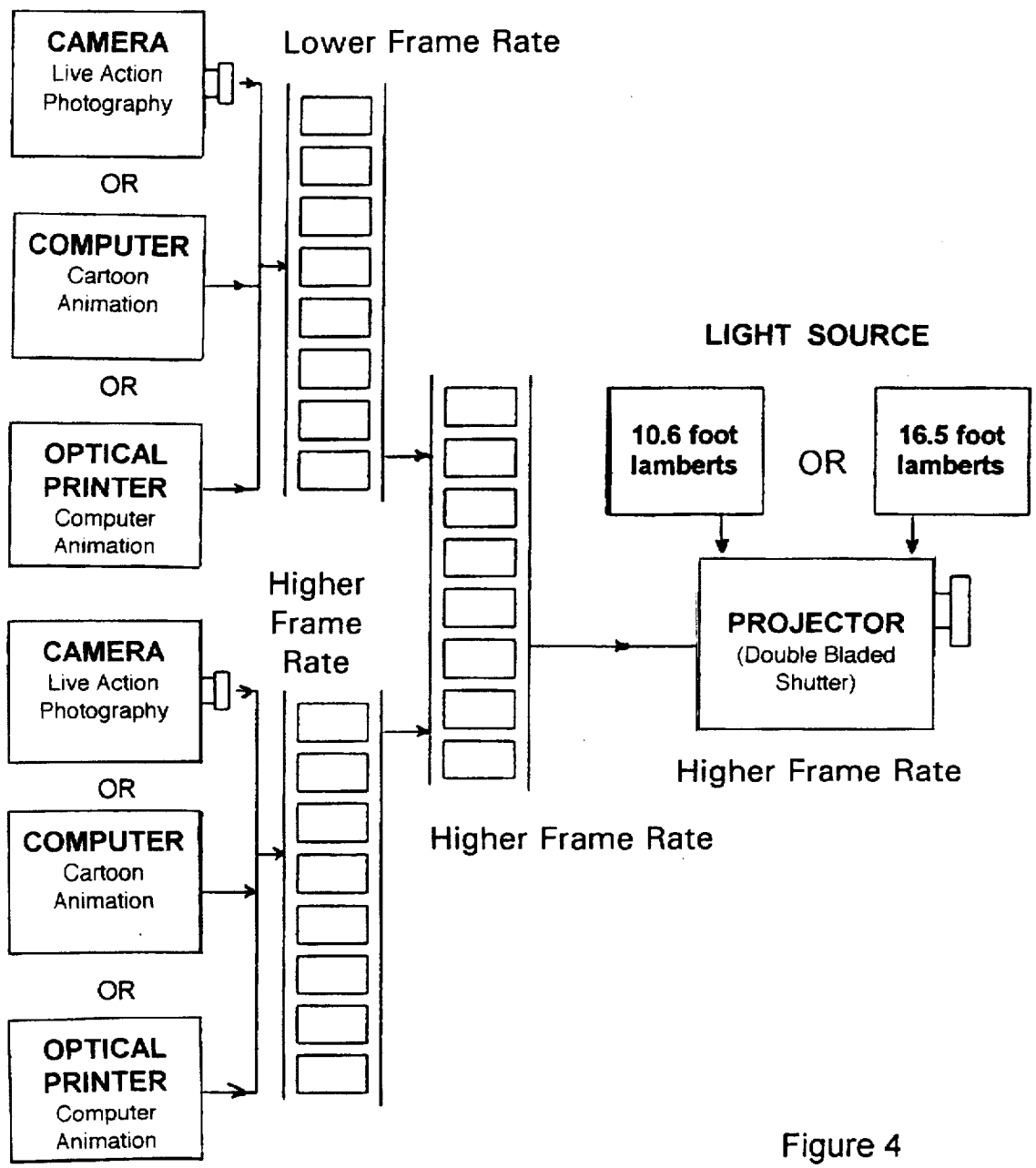
FIG. 4 shows a block diagram of the system used in the preferred embodiment of the invention. Film images from a camera, optical printer or commuter are recorded onto separate film strips at two different frame rates, these image components are composited onto another film strip, and this film strip is projected at the higher of the two aforementioned fame rates, at a light brightness level of typically 10.6 footlamberts (conventional light level) or 16.5 footlamberts or above (high brightness level).

The invention described herein is a method for combining two levels of visual impact simultaneously in a motion picture presentation. Certain image components are photographed or Printed at a frame rate of thirty frames per second or less and impart to the viewers of the film the sort of experience associated with the "cinematic" look now perceived with conventional motion picture exhibition; including such artifacts as strobing, flicker, motion blur and interpolation of motion that does not quite appear smooth. For the purposes of this invention, these artifacts are desirable for cinematic artistry and essential to keep from overwhelming the viewers. By contrast, other image components are photographed or printed at a frame rate in excess of thirty frames per second. Because of the lifelike appearance of motion and lack of artifacts associated with lower frame rates, these image components appear palpably more realistic when viewed. These two sequences photographed at different rates are composited or cut together onto a single strip of film to produce an image that appears highly realistic in part and "cinematic" in the other.

This method can be applied to such frame rate combinations as 24 and 48 fps, 25 and 50 fps, 26 and 52 fps, and 30 and 60 fps, as well as combinations of frame rates in between. Use of 24 and 48 fps has previously been disclosed by the inventor.

The drawings provide an example of the compositing method. There were sequences in Jurassic Park where people (photographed running as live action) appeared to be chased by dinosaurs, which were computer-animated creations. In the actual most-production of Jurassic Park, the live-action images of the people running were composited with the computer-animated images of the dinosaurs, both at 24 fps. For the present invention, let us assume that the "lower frame rate" is 25 fps and the "higher frame rate" is 50 fps, the same frequency as AC power in Europe and other places outside North America. Let us assume that similar live action images of a man running (FIG. 1) and photographed at the lower frame rate, are composited with computer-animated dinosaurs (FIG. 2) with twice as many images presented per second as are presented on the film depicted in FIG. 1. FIG. 3 depicts the composited images resulting from the mixing of the image components in FIGS. 1 and 2. The images depicted will be projected to the audience at the higher frame rate, with each image component from FIG. 1 presented twice. What the viewers perceive is that the man in FIG. 1 appears "cinematic" and confined to the apparent plane of the screen, while the dinosaurs depicted in FIG. 2 will appear much more realistic. Their motion will appear smoother than that of the man, and the dinosaurs will seem to be free from the confinement of the apparent plane of the screen. Thus, the dinosaurs will appear able to "pop out" from the confines of the screen and jump toward the audience, scaring the viewers even more than was possible in the original motion picture (produced entirely at 24 fps). In converting from the lower frame rate to the higher frame rated each image on FIG. 1 is printed twice, so image component 11 appears at composited images 31 and 31'; image component 12 is printed at composite images 32 and 32' and image component 13 is printed at composited images 33 and 33' Adding the image components photographed at the higher frame rate, image components 21 and 21' are mixed successively with image component 11 to form composited images 31 and 31'. Similarly, image components 22 and 22' are mixed with image component 12 to form images 32 and 32' and image components 23 and 23' are mixed with image component 13 to form composited images 33 and 33' This compositing treatment continues throughout the entire scene, as long as the filmmaker wishes to combine onto a single image both components that have the "cinematic look" of the lower frame rate and the high-impact look of the higher frame rate.

In the preferred embodiment of this invention, projection of films should be accomplished by a projector featuring high-speed pulldown and highly accurate pin registration. Conventional Geneva projectors are suitable; but they do not deliver the desired effect in its entirety, especially for projection rates in excess of 48 fps (rates between 50 and 60 fps are contemplated in this invention). In the preferred embodiment of the invention, a Showstar "Linear Loop" projector manufactured by the Pioneer Technology Corp. of Burbank, Calif. is used. In accordance with the method described, all projection is done at the higher of the two frame rates, where high-speed projector operation is desirable. Use of a double bladed shutter at such frame rates elimates flicker and other "cinematic looking" artifacts by presenting in escess of 96 image impressions (100 to 120 are contemplated in the practice of this invention) per second to the viewer.

In the preferred embodiment of the invention, the film format used is 70 mm film (65 mm negative) with five perforations per frame. However, the method described can produce the desired differences in viewer perception of realism between image components when used with any standard or nonstandard film format. Nonpicture information, such as audio, time codes and commands for events that accompany the showing of the film (such as switching on a bright light source for certain scenes when the intercutting method described here is used) can be imparted to the film in any method conventionally known in the cinema art.

If it is not desired to composite image components photographed at two different frame rates onto a single strip of film, a similar difference between levels of impact as seen by the audience can be obtained by intercutting film sequences photographed at different frame rates. Entire scenes or sequences within scenes can be photographed at the lower frame rate when a high-impact presentation is not desired and a "cinematic look" is preferred. For example, a scene where dialog is highlighted would be Photographed at a low frame rate (thirty frames per second or less) and each image printed onto two successive film frames for projection at the higher frame rate. A visually impressive scene (such as an automobile race or a busy New York scene) would be photographed at the higher frame rate for projection at that frame rate. Scenes that would retain the "cinematic look" would then be intercut with scenes designed to provide an enhanced visual impact, during postproduction. As an example, scenes for which the "cinematic look" is desired would be photographed at 25 frames per second and double-frame printed during postproduction. Other scenes, for which a more realistic look is desired, would be photographed at 50 frames per second and printed in the conventional manner for projection at that speed. Both types of scenes would be intercut onto the same reel of film for exhibition.

As an added feature, commands can be imparted onto the film to be shown. These commands would switch on a brighter light source in the projector to deliver more light when the high-impact scenes are being shown, while other commands would activate the return to conventional light levels when scenes delivering the "cinematic look" are shown. It is contemplated that the light levels in use would be about 10.6 footlamberts (for conventional light levels) and 16.5 footlamberts or more for high-impact scenes.

Transitioning between two different light levels was taught in Weisgerber's previous invention, U.S. Pat. No. 5,096,286 (1992).

The invention described here now allows the filmmaker to modulate the amount of impact that a component of an image will have upon the viewers of the film being produced; not only between scenes, but also with simultaneous action within a single film sequence. This creative control can be used in many different ways. Live action photographed at the lower frame rate can be composited with other live action photographed at the higher frame rate, so that people who will appear "cinematic" to the audience will be watching other people involved in action that will look highly realistic and dimensional. Live action can also be composited with animation. Live action photographed at the lower frame rate will give the impression that real people have been dropped into a cartoon setting. Live action photographed at the lower frame rate can also be composited with animation printed for exhibition at the higher frame rate. Any style of animation can be used, from cartoon drawings to sophisticated computer-generated images. Animation at the lower frame rate can also be combined with animation at the higher frame rate. In any application, the image components photographed or printed at the higher frame rate deliver a dimensional effect not noticed at the lower frame rate, since viewers perceive the screen itself as an artifact of projection at the lower frame rate. The images photographed at the higher frame rate will appear to escape its bounds.

This method is feasible for installation in any conventional motion picture theater, as opposed to such high-impact systems as IMAX and SHOWSCAN, whose lack of adaptability to the theatrical exhibition marketplace limit their use to special venues and make them unsuitable for wide distribution, as disclosed in No. 5,xxx,xxx.

Conventional equipment is used in the invention described, except that the preferred projector should be a high-speed pulldown, pin registered type equipped to show films at the higher frame rate used in the preparation of the film, through a double bladed shutter.

The expansion of the invention described here to frame rate combinations other than 24 and 48 fps allows easier conversion from nonstandard film formats and frame rates to formats acceptable for general release and exhibition. While the 70 mm film format is most desirable, the invention described will improve audience impact over that currently available with 35 mm and other standard film formats. All film formats, of any size or aspect ratio, can be accommodated by moving the masks that surround the screen in accordance with prior art taught by Vetter, U.S. Pat No. 3,475,086 (1969)(upper and side masks) and Weisgerber, U.S. Pat. No. 5,121, 086 (1992)(lower screen mask).

Conversion to standard frame rates four general distribution and exhibition can also be accomplished through the invention described here. Films photographed at 60 frames per second (e.g. SHOW-SCAN) or similar frame rates can be converted to the emerging speed of 30 frames per second for exhibition, by printing every other frame of the film to be converted. However, image deletion may interfere with the viewer's perception of motion on the screen by eliminating the motion blur that the viewer expects. To restore a look consistent with such expectations, motion blur can be added by digitizing the images and adding motion blur through computerized techniques. For example, a program called Softimage Eddie 3.5 version, developed by Softimage of Toronto, Ontario, Canada, can be used to add motion blur as a desirable artifact for conventional cinema presentation.

This method for conversion can also be used to convert films prepared according to Weisgerber's recent invention for general release. While that invention covered frame rates of twenty-four and forty-eight frames per second, need for motion blur as a desirable artifact was not discussed, and the method of adding motion blur was not disclosed. For release to theaters where only projection at twenty-four frames Per second is feasible, the scenes or image components originally photographed or printed at forty-eight frames per second must be alternate-frame printed to accommodate exhibition at the lower frame rate. Deleting every other frame eliminates the appearance that motion is smooth, in certain cases. To remedy this problem, motion blur can be added by digitizing images using the computerized method mentioned above.

The method described is available for use with any Film format, and transfer of images can be accomplished through an optical printer or by use of computerized image transfer processes known in the art. To enhance audience impact, the improved resolution available by using the recommended projector permits greater magnification and, therefore, a larger screen to be fitted to the architecture of the auditorium than had heretofore been feasible. No change is made in the physical film stock; only the frame rates are varied and selected to produce the desired effect. The lower frame rate must be thirty frames per second or less, while the higher frame rate must be more than thirty frames per second. While it is expected that the higher frame rate be double the lower frame rate, this invention will work with other combinations of frame rates. It is only required that the projector used for exhibition of such films be able to show the films at the higher frame rate. While this method has been shown and described for the combination of 24 or 48 frames per second, the invention herein allows expansion of the method to other frame rate combinations. In the practice of the invention, audio and other nonpicture information can be recorded onto the film to be shown in the usual ways known in the cinema art. This includes double system methods for audio recording and playback. Due to the high-impact nature of some of the images to be presented, however, it is expected that the sound system used will also present an appropriate level of auditory input.

This invention expands the creative latitude available to the filmmaker. It is now possible to modulate audience perception of reality in an easy and inexpensive manner, maintaining compatibility with conventional theatrical presentation and distribution this can now be done in any film format and at any combination of frame rates, making this method truly universal. The examples described for applications of this method should be viewed as illustrative and not limiting. Other prospective applications and embodiments of this invention should be considered as lying within its scope.

The invention claimed is:

1. A method for imparting different image components onto a strip of motion picture film for exhibition to audiences, wherein certain image components recorded onto a first strip of motion picture film at a lower frame rate are combined with different image components recorded onto a second strip of motion picture film at a higher frame rate to produce a resultant cinematic image on a third strip of motion picture film, with the resultant image imparted onto said third film strip to be shown to the members of said audiences, comprising:

a. photographing or printing successive visual image components onto said first strip of motion picture film; said image components photographed or printed at a frame rate of thirty frames per second or less, where such frame rate is not twenty-four frames per second; and b. photographing or printing successive visual image components which are different from those photographed or printed onto the first strip of motion picture film; the image components on said second strip of motion picture film photographed or printed at a frame rate in excess of thirty frames per second, said frame rate being double the frame rate at which the images photographed or printed onto said first strip of motion picture film are photographed or printed thereon, and such frame rate is not forty-eight frames per second; and c. superimposing the image components on said first strip of motion picture film and the image components on said second strip of motion picture film, for exhibition to motion picture audiences at the same frame rate that was used for photographing or printing said image components onto the second strip of film; said third strip of motion picture film further containing audio and other nonpicture information normally imparted onto such films for exhibition.

2. The method as in claim 1, whereby such superimposition is accomplished by means of optical printing or computerized image transfer.

3. The method as in claim 1, whereby the image components recorded onto said first strip of motion picture film are each transferred twice, onto two successive frames of said third strip of motion picture film, composited with each successive image component transferred from said second strip of motion picture film; with said third strip of motion picture film containing a composite image made up of said image components from said first and second strips of motion picture film; said third strip of motion picture film to be projected in a motion picture theater at the same frame rate at which said image components were recorded onto said second strip of motion picture film.

4. The method as in claim 1, in which the image components recorded onto said first strip of motion picture film are recorded at a frame rate selected from the group consisting of sixteen, eighteen, twenty-five, twenty-six or thirty frames per second, and the image components recorded onto said second strip of motion picture film and the image components transferred to said third strip of motion picture film are recorded and transferred at a rate double the rate at which image components are recorded onto said first strip of motion picture film.

5. The method as in claim 4, whereby the images transferred onto said third strip of motion picture film are exhibited to said audiences at a rate selected from the group consisting of thirty-two, thirty-six, fifty, fifty-two or sixty frames per second, through a projector equipped with a double bladed shutter, resulting in the delivery of two flashes of light per image and a number that is exactly double the frame rate so selected of impressions of light per second to the persons viewing said film.

6. The method as in claim 1, in which said image components are recorded onto said first and second strips of motion picture film by means of photographing live action, cartoon animation or computerized animation.

7. A strip of motion picture film containing cinematic images; certain portions of such images having been recorded onto said film strip at a frame rate of thirty frames per second or less, and the remaining portions of such images having been recorded onto said film strip at a frame rate double the aforementioned frame rate; such portions of images having been composited onto said film strip, and said film strip further containing audio and other nonpicture information normally imparted onto such films for exhibition; such exhibition occurring by means of projection of said film strip at the higher of the two frame rates at which said portions of images are recorded or composited onto said film strip.

8. The strip as in claim 7, in which the portions of said images composited onto said strip were originally recorded onto other strips of motion picture film for transfer onto said strip, through photography of live action, cartoon animation or computerized animation techniques.

9. The film strip as in claim 7, where the higher of the two aforementioned frame rates is a rate selected from the group consisting of thirty-two, thirty-six, fifty, fifty-two and sixty frames per second.

10. A method for producing motion picture films for theatrical audiences comprising the impartation onto motion picture film of selected cinematic images or selected portions of cinematic images originally recorded at a lower frame rate of thirty frames per second or less, and further comprising the impartation onto said motion picture film of other cinematic images or other portions of cinematic images originally recorded at a higher frame rate that is double the lower frame rate; said portions of images being composited onto said films or said selected images originally recorded at the lower frame rate being intercut with said selected images originally recorded at said higher frame rate; said films further projected upon exhibition at said higher frame rate; where the lower frame rate is not twenty-four frames per second and the higher frame rate is not forty-eight frames per second; where the improvement consists of the compositing of cinematic image components originally recorded at two different frame rates, or the intercutting of cinematic images originally recorded at two different frame rates, onto a film to be projected at the higher of the two frame rates for exhibition to audiences.

11. The method as in claim 10, whereby entire scenes which are recorded at said higher frame rate are intercut with other scenes recorded at said lower frame rate; all of said scenes being combined onto motion picture films for exhibition to said audiences.

12. The method as in claim 11, in which said film is exhibited to said audiences at said higher frame rate.

13. The method as in claim 12, in which said scenes recorded at the higher frame rate are shown through a projector with a light source capable of delivering a light level of 16.5 footlamberts or more, while the scenes originally recorded at the lower frame rate are shown through the same projector with said light-source limited to delivering a light level of 10.6 footlamberts or less, with the effect that the scenes originally recorded at said higher frame rate appear to the members of said audiences to be more brightly illuminated than the scenes on said film originally recorded at said lower frame rate.

* * * * *